US012337308B2

(12) United States Patent
Finch et al.

(10) Patent No.: US 12,337,308 B2
(45) Date of Patent: Jun. 24, 2025

(54) METHOD FOR PRODUCING RESIN USEFUL IN SEMICONDUCTOR MANUFACTURING

(71) Applicants: DDP SPECIALTY ELECTRONIC MATERIALS US 5, LLC, Wilmington, DE (US); DDP Specialty Products Japan K.K., Tokyo (JP)

(72) Inventors: John David Finch, Newark, DE (US); Katsuya Takuwa, Tokyo (JP)

(73) Assignees: DDP SPECIALTY ELECTRONIC MATERIALS US 5, LLC; DDP SPECIALTY PRODUCTS JAPAN.K.K. (JP)

( * ) Notice: Subject to any disclaimer, the term of this patent is extended or adjusted under 35 U.S.C. 154(b) by 693 days.

(21) Appl. No.: 17/293,191

(22) PCT Filed: Nov. 19, 2019

(86) PCT No.: PCT/US2019/062112
§ 371 (c)(1),
(2) Date: May 12, 2021

(87) PCT Pub. No.: WO2020/112428
PCT Pub. Date: Jun. 4, 2020

(65) Prior Publication Data
US 2022/0001372 A1     Jan. 6, 2022

Related U.S. Application Data

(60) Provisional application No. 62/771,623, filed on Nov. 27, 2018.

(51) Int. Cl.
| | |
|---|---|
| *B01J 49/60* | (2017.01) |
| *B01J 45/00* | (2006.01) |
| *B01J 47/02* | (2017.01) |
| *B01J 49/50* | (2017.01) |
| *C02F 1/42* | (2023.01) |
| *C02F 101/10* | (2006.01) |
| *C02F 103/04* | (2006.01) |
| *C02F 103/34* | (2006.01) |

(52) U.S. Cl.
CPC ............ *B01J 45/00* (2013.01); *B01J 47/02* (2013.01); *B01J 49/50* (2017.01); *B01J 49/60* (2017.01); *C02F 1/42* (2013.01); *C02F 2101/108* (2013.01); *C02F 2103/04* (2013.01); *C02F 2103/346* (2013.01)

(58) Field of Classification Search
CPC ............ C02F 2013/04; C02F 2013/346; C02F 2101/108; C02F 1/42; B01J 45/00; B01J 49/60; B01J 49/50
See application file for complete search history.

(56) References Cited

U.S. PATENT DOCUMENTS

| | | | |
|---|---|---|---|
| 3,567,369 A | 3/1971 | Chemtob | |
| 6,756,462 B2 | 6/2004 | Pafford et al. | |
| 2009/0057231 A1* | 3/2009 | Schelhaas | B01J 45/00 |
| | | | 428/407 |
| 2015/0053620 A1* | 2/2015 | Suri | B01J 20/261 |
| | | | 210/683 |
| 2019/0366233 A1* | 12/2019 | Lee | B01J 45/00 |

FOREIGN PATENT DOCUMENTS

| | | | | |
|---|---|---|---|---|
| EP | 1273345 A2 | 1/2003 | | |
| JP | S6010248 A | 1/1985 | | |
| JP | 2002126543 A | 5/2002 | | |
| JP | 2003-073420 A | 3/2003 | | |
| JP | 4518112 B2 | 8/2010 | | |
| JP | 2016141738 A | 8/2016 | | |
| WO | WO-2005023409 A2 * | 3/2005 | ............ | B01J 20/26 |
| WO | WO-2018124349 A1 * | 7/2018 | ............ | B01D 15/00 |

OTHER PUBLICATIONS

Kalaitzidou, K. Evaluation of boron uptake by anion exchange resins in tap and geothermal water matrix. Materials Today: Proceedings 5 (2018) 27599-27606. (Year: 2018).*
International Search Report and Written Opinion in International Application No. PCT/US2019/062112, issued Mar. 11, 2020.
Badruk et al., "Removal of Boron from Wastewater of Geothermal Power Plant by Selective Ion-Exchange Resins. II col. Sorption-Elution Studies", Separation Science and Technology, vol. 34, No. 15, Oct. 20, 1999, pp. 2981-2995.
Wolska et al., "Preparation of polymeric microspheres for removal of boron by means of sorption-membrane filtration hybrid", Desalination, vol. 283, Mar. 29, 2011, pp. 193-197.

* cited by examiner

*Primary Examiner* — Christina H. W. Rosebach

(57) ABSTRACT

A method for producing an ion exchange resin. The method comprises steps of: (a) providing a basic ion exchange resin in the acidic form which comprises amino polyol groups and has a volume % swell from 15 to 30% upon conversion from the basic form to the acidic form, and (b) washing the resin with water or aqueous acid.

10 Claims, No Drawings

METHOD FOR PRODUCING RESIN USEFUL IN SEMICONDUCTOR MANUFACTURING

BACKGROUND

This invention relates generally to a method for producing an ion exchange resin useful in purifying water used in semiconductor manufacturing.

Recently the trend of Ultra-Pure Water (UPW) design is towards Reverse Osmosis (RO) plus Electrodeionization (EDI). With this design it is critical to reduce boron to very low levels. Boron selective ion exchange resins, e.g., amino polyol functionalized resins, are an attractive option for this. However the resins need to be exceptionally clean, i.e., having low total organic carbon (TOC) and to produce water with high resistivity. The resins also need to be physically stable and have high capacity to remove boron. For example, JP4518112 discloses a method for reducing TOC in amino polyol resins. However, this reference teaches a method using harsh conditions which may impact other resin properties.

STATEMENT OF INVENTION

The present invention is directed to a method for producing an ion exchange resin. The method comprises steps of:
(a) providing a basic ion exchange resin in the acidic form, said resin comprising amino polyol groups and having a volume % swell from 15 to 30% upon conversion from the basic form to the acidic form, and
(b) washing the resin with water or aqueous acid.

The present invention is further directed to an ion exchange resin comprising from 2 to 4 wt % polymerized units of a crosslinker, a macroreticular structure, from 2.0 to 3.2 equivalents/kg of active sites, said active sites comprising amino polyol functional groups.

DETAILED DESCRIPTION

All percentages are weight percentages (wt %), and all temperatures are in ° C., unless otherwise indicated. Averages are arithmetic averages unless indicated otherwise. All operations are performed at room temperature (18 to 25° C.) unless specified otherwise.

The polymerization, chloromethylation, and amination steps are designed to give a final product that has a swell on conversion from free base to acid form of 15-30%. This swell is determined by crosslinking and by the number and type of functional groups. There are three types of crosslinking: (i) crosslinking from copolymerization of crosslinkers with styrenic monomers, (ii) methylene bridging occurring in the chloromethylation, and (iii) reaction of the amino polyol with two chloromethyl groups in the amination (strong base groups). The degree of chloromethylation and amination impact the relative numbers of different functional groups.

"Styrenic monomers" include monoethylenically unsaturated aromatic compounds, e.g., styrene, vinyltoluene, ethylvinylbenzene, chlorostyrene, and vinylnaphthalene. "Styrenic crosslinkers" include multiethylenically unsaturated aromatic compounds such as divinylbenzene and trivinylbenzene. Other monoethylenically unsaturated compounds can be added, preferably in amounts less than 10 wt % (preferably less than 5 wt %) for product improvements such as strength, preferably, e.g., methacrylic acids and their esters, vinylpyridines, acrylonitrile, vinyl ethers, esters, and ketones. Multiethylenically unsaturated compounds can also be used as crosslinkers, preferably, e.g., trivinylcyclohexane, and di and tri methacrylate compounds such as trimethylol propane trimethacrylate. Percentages of monomer units in a polymer are based on total polymer weight (dry weight). The term "gel" resin applies to a resin which was synthesized from a very low porosity (0 to 0.1 cm$^3$/g), small average pore size (0 to 17 Å) and low B.E.T. surface area (0 to 10 m$^2$/g) copolymer. The term "macroreticular" (or MR) resin is applied to a resin which is synthesized from a high mesoporous copolymer with higher surface area than the gel resins. The total porosity of the MR resins is between 0.1 and 0.7 cm$^3$/g, average pore size between 17 and 500 Å and B.E.T. surface area between 10 and 200 m$^2$/g. MR resins typically are made by incorporating an organic solvent ("porogen") into the monomer mixture. The term adsorbent resin is applied to a resin which can be functionalized or not, and which has very high surface area and porosity. These adsorbents have surface area between 200 and 1300 m$^2$/g, average pore size between 17 and 1000 Å and total porosity between 0.7 and 200 cm$^3$/g.

The "harmonic mean diameter" (HMD) is defined by the following equation:

$$HMD = \frac{N}{\sum_{i=1}^{N}\left(\frac{1}{d_i}\right)}$$

where i is an index over the individual beads; $d_i$ is the diameter of each individual particle; and N is the total number of beads. Resin beads are substantially spherical.

The method of this invention preferably employs a basic ion exchange resin comprising from 2 to 4 wt % polymerized units of a crosslinker; a macroreticular structure; and from 2.0-3.2 equivalents/kg of active sites, said active sites comprising amino polyol functional groups. Active sites are amino groups and quaternary ammonium groups.

Preferably, the crosslinker has two polymerizable carbon-carbon double bonds per molecule. Preferably, the crosslinker has a molecular weight from 100 to 400, preferably 100 to 250, preferably 120 to 200. Preferably, the resin comprises from 2.5 to 3.5 wt % polymerized units of crosslinker. Preferably, the resin comprises from 96 to 98 wt % styrenic monomers, preferably 96.5 to 97.5 wt %. Preferably, the crosslinker is divinylbenzene. Preferably, the resin comprises from 96 to 98 wt % polymerized units of styrene and from 2 to 4 wt % polymerized units of divinylbenzene; preferably from 96.5 to 97.5 wt % polymerized units of styrene and from 2.5 to 3.5 wt % polymerized units of divinylbenzene.

Preferably, the copolymer is chloromethylated, preferably under conditions that give 90-100% substitution of the styrenic monomer. Chloromethylation is performed under conditions to minimize methylene bridging that could lower the swell. The crosslinked chloromethylated styrenic polymer is then aminated with an amino polyol, preferably N-methylglucamine. Preferably, after amination, the resin comprises from 2.0-3.2 equivalents/kg of active sites, preferably at least 2.3 equivalents/kg of active sites, preferably at least 2.5 equivalents/kg of active sites; preferably no more than 3.1 equivalents/kg of active sites, preferably no more than 3.0 equivalents/kg of active sites; preferably 2.5-3.0 equivalents/kg of aminopolyol groups.

Preferably, the amino polyol group comprises from 3 to 9 carbon atoms, preferably at least 4, preferably at least 5, preferably at least 6; preferably no more than 8, preferably no more than 7. Preferably, the amino polyol group comprises from 2 to 8 hydroxyl groups, preferably at least 3, preferably at least 4, preferably at least 5; preferably no more than 7, preferably no more than 6. Preferably, the amino polyol group has 7 carbon atoms and 5 hydroxyl groups. N-methylglucamine is especially preferred. The amino polyol group in the resin is produced by allowing a chloromethylated crosslinked polymer comprising polymerized units of styrenic monomers to react with an amino polyol. The amino polyol is bonded to one or two benzene rings by a nitrogen-carbon bond between the amino nitrogen and a methylene group attached to the benzene ring, as illustrated below for N-methylglucamine and a crosslinked polystyrene.

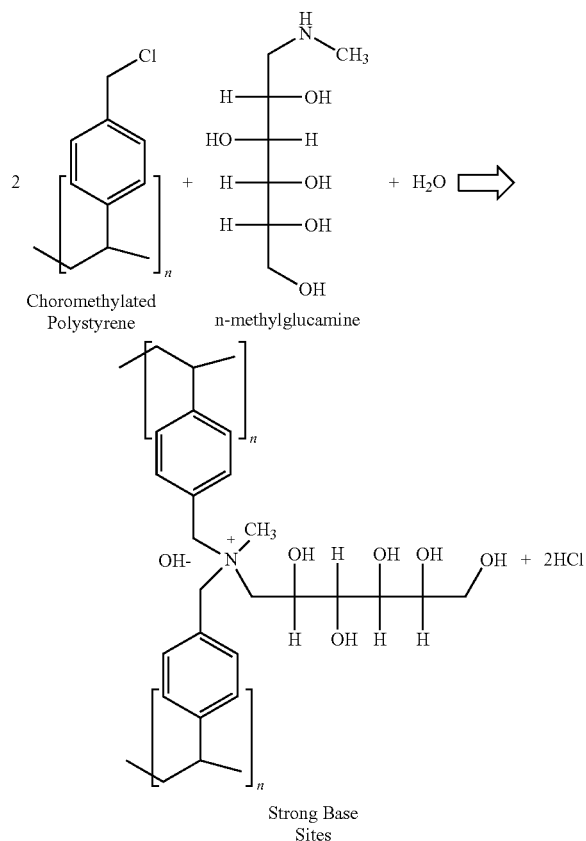

When the amino polyol N-methylglucamine is bound to two benzene rings nitrogen is part of a quaternary amine (strong base) group. This crosslinks the polymer and decreases the swell. Preferably, the resin after the amination process has from zero to 30% strong base, preferably 5-20% strong base, preferably 5-10% strong base, based on total basic sites.

The basic ion exchange resin in the acidic form is produced by adding aqueous acid to the resin in the basic form and allowing the resin to soak. Preferably, the acid soak is repeated at least once. Conditions for acid treatment of ion exchange resins are well known. The water or aqueous acid wash following acid treatment is performed according to known processes. Preferably, the resin is washed with at least 20 BV of DI water, preferably at least 40 BV of DI Water, preferably at least 60 BV of DI Water. Preferably, the temperature of the DI water is from 50° C. to 100° C., preferably 50° C. to 85° C. (loss of strong base is possible above 85° C.), preferably 75° C.-85° C. Preferably, water is used as a wash. If aqueous acid is used the acid concentration preferably is less than 10 wt %, preferably less than 5 wt %, preferably less than 1 wt %. Preferably, the resin is converted back to the basic form for use by contacting it with aqueous base under well-known conditions.

Preferably, the ion exchange resin particles have a harmonic mean diameter from 100-1500 µm, preferably at least 300 µm, preferably at least 400 µm; preferably no greater than 1000 µm, preferably no greater than 700 µm preferably no greater than 600 µm.

EXAMPLES

Abbreviations used: DI=deionized; BV=bed volumes; TOC=total organic carbon; MHC=moisture holding capacity; WC=weight capacity (equivalents active sites/kg), VC is volume capacity on a per liter basis; SB=strong base (equivalents of strong base/total equivalents (strong and weak base)).

EXAMPLES

Best Practice—Example 1 (80 C Wash After Acid Treatment)

1. To a 5 gallon vessel add 7 liters of Dowex™ BSR-1 Chelating Resin. The resin was measured to have a swell (OH to Cl) of 22%
2. Add 7 liters of 4 wt % HCl.
3. Allow to soak for 30 minutes, remove liquid with siphon
4. Repeat steps 2 and 3 twice (total of 21 liters of HCl)
5. Add 7 liters of DI Water
6. Allow to soak for 20 minutes, remove liquid with siphon
7. Repeat steps 2 and 3 twice (total of 21 liters of DI Water)
8. Repeat steps 1-7 to make a total of 14 liters of HCl treated BSR-1 Resin
9. To a 20 liter glass column (5.5 in diameter) charge 14 liters of HCl treated BSR-1 Resin
10. Pass 80° C. DI Water downflow through the column at 6.6 BV/hr (1540 ml/min) for 13 hr
11. Pass ambient DI Water downflow through the column at 6.6 BV/hr (1540 ml/min) for 13 hr
12. Pass 21 liters of 4% NaOH through the column at 350 ml/min for 60 min.
13. Stop flow and allow resin to soak in the 4% NaOH for 30 minutes
14. Repeat steps 12 and 13
15. Pass ambient DI Water downflow through the column at 6.6 BV/hr (1540 ml/min) for 6.5 hr
16. Packout and dewater with siphon The final resin was analyzed for baseline delta-TOC and resistivity using an Anatel A-1000 at 50 BV/hr. The baseline delta-TOC rinsed down to 2.0-2.1 ppb and the resistivity rinsed up to 18.1 MOhm-cm. The static boron capacity was measured to be 3.8 g-boron/kg resin before the above wash. After washing the static boron capacity was measured to be 3.5 g-boron/kg resin (92% of original capacity)

The routine properties were not impacted by the wash process.

| Product | MHC (%) | WC Total (eq/kg) | VC Total (eq/L) | SB WC (eq/kg) | SB VC (eq/L) | WB WC (eq/kg) | WB VC (eq/L) | SB % |
|---|---|---|---|---|---|---|---|---|
| BSR-1 Spec | 51-59 | | 0.7 | | | | | |
| Plant BSR-1 (Example 1 Initial) | 56.1 | 2.84 | 0.87 | 0.26 | 0.08 | 2.58 | 0.79 | 9.2 |
| Pilot plant BSR-1 (Ex. 1 conditions) | 55.6 | 2.77 | 0.84 | 0.21 | 0.06 | 2.56 | 0.78 | 7.6 |

Comparative—Example 2 (PWA10 with Cross Treatment)

1. To a beaker add 500 ml of Amberlite™ PWA10. The resin was measured to have a swell (OH to HCl) of 7%
2. Add 500 ml of MilliQ water and soak overnight
3. Remove the liquid with a siphon
4. Add 500 ml of 1N HCl. Contact for 30 seconds.
5. Remove the liquid with a siphon
6. Repeat steps 3-4
7. Transfer the resin to a glass column
8. Pass 1N HCl through the resin at 4 BV/hr (33 ml/min) for 1.4 hr at ambient temperature
9. Pass MilliQ water though the resin at 4 BV/hr (33 ml/min) for 1.0 hr at ambient temperature
10. Pass 1N NaOH through the resin at 4 BV/hr (33 ml/min) for 1.3 hr at ambient temperature
11. Pass MilliQ water though the resin at 4 BV/hr (33 ml/min) for 1.0 hr at ambient temperature
12. Repeat steps 10-11

The final resin was analyzed for baseline delta-TOC and resistivity using an Anatel A-1000 at 25 BV/hr. The baseline delta-TOC rinsed down to 34.5 ppb and the resistivity rinsed up to 18.2 MOhm-cm.

Comparative—Example 3 (BSR-1 with Cross Treatment)

1. To a beaker add 500 ml of Dowex™ BSR-1 Chelating Resin. The resin was measured to have a swell (OH to Cl) of 22%
2. Add 500 ml of MilliQ water and soak overnight
3. Remove the liquid with a siphon
4. Add 500 ml of 1N HCl. Contact for 30 seconds.
5. Remove the liquid with a siphon
6. Repeat steps 3-4
7. Transfer the resin to a glass column
8. Pass 1N HCl through the resin at 4 BV/hr (33 ml/min) for 1.4 hr at ambient temperature
9. Pass MilliQ water though the resin at 4 BV/hr (33 ml/min) for 1.0 hr at ambient temperature
10. Pass 1N NaOH through the resin at 4 BV/hr (33 ml/min) for 1.3 hr at ambient temperature
11. Pass MilliQ water though the resin at 4 BV/hr (33 ml/min) for 1.0 hr at ambient temperature
12. Repeat steps 10-11

The final resin was analyzed for baseline delta-TOC and resistivity using an Anatel A-1000 at 25 BV/hr. The baseline delta-TOC rinsed down to 9.8 ppb and the baseline resistivity rinsed up to 18.2 MOhm-cm.

Comparative—Example 4 (PWA10 Washed at 90 C)—PAC-BSR-11

1. To a 2 inch diameter jacketed glass column charge 150 ml of Amberlite™ PWA10.
2. Pass 90 C DI water downflow through the column at 6.6 BV/hr (16 ml/min) for 6.5 hr
3. Pass ambient DI water downflow through the column at 13 BV/hr (33 ml/min) for 1.9 hr
4. Packout and dewater with siphon The final resin was analyzed for baseline delta-TOC and resistivity using an Anatel A-1000 at 50 BV/hr. The baseline delta-TOC rinsed down to 2.5 ppb and the baseline resistivity rinsed up to 17.7 MOhm-cm. The static boron capacity was measured to be 4.2 g-boron/L-resin before the above wash. After washing the static boron capacity was measured to be 3.2 g-boron/L-resin (77% of original capacity).

This wash process changed the % strong base from 34.5% to 13.9%.

| Product | MHC (%) | WC Total (eq/kg) | VC Total (eq/L) | SB WC (eq/kg) | SB VC (eq/L) | WB WC (eq/kg) | WB VC (eq/L) | SB % |
|---|---|---|---|---|---|---|---|---|
| PWA10 spec | 48.0-54.0 | >2.00 | >0.70 | | | | | 0-42 |
| Plant PWA10 (Example 4 initial) | 51.8 | 2.15 | 0.74 | 0.75 | 0.26 | 1.40 | 0.48 | 34.8 |
| PAC-BSR-11 (Example 4) | 52.1 | 2.37 | 0.78 | 0.33 | 0.11 | 2.04 | 0.67 | 13.9 |

The invention claimed is:
1. An ion exchange resin comprising from 2 to 4 wt % polymerized units of divinylbenzene, a macroreticular structure, and from 2.5 to 3 equivalents/kg of active sites, said active sites comprising amino polyol functional groups; said macroreticular structure having a total porosity of between 0.1 and 0.7 cm$^3$/g, an average pore size between 17 and 500 Å, and a B.E.T. surface area between 10 and 200 m$^2$/g; said ion exchange resin having a TOC of 2.0 to 2.1 ppb and a resistivity of 18.1 MOhm-cm.

2. The ion exchange resin of claim 1 which comprises from 96 to 98 wt % of polymerized units of styrenic monomers.

3. The ion exchange resin of claim 1 in which the amino polyol is N-methylglucamine.

4. The ion exchange resin of claim 1 that comprises from zero to 30% strong base sites, based on total basic sites.

5. The ion exchange resin of claim 1 that is a basic resin in the acidic form, said resin having a volume % swell from 15 to 30% upon conversion from the basic form to the acidic form.

6. The ion exchange resin of claim 1 that is a basic resin in the acidic form.

7. A method for producing the ion exchange resin of claim 1; said method comprising steps of:
 (a) providing a basic ion exchange resin in the acidic form, said resin comprising amino polyol groups and having a volume % swell from 15 to 30% upon conversion from the basic form to the acidic form, and
 (b) washing the resin with water or aqueous acid.

8. The method of claim 7, further comprising the step of
 (c) contacting the resin with aqueous base.

9. A method for producing the ion exchange resin of claim 1; said method comprising steps of:
 (a) providing a basic ion exchange resin in the acidic form, said resin having a macroreticular structure; and said resin comprising from 2 to 4 wt % polymerized units of a crosslinker and from 2.0 to 3.2 equivalents/kg of active sites, said active sites comprising amino polyol functional groups, and
 (b) washing the resin with water or aqueous acid.

10. The method of claim 9, further comprising the step of
 (c) contacting the resin with aqueous base.

\* \* \* \* \*